Aug. 16, 1960 W. R. KING 2,949,349
CARBON BLACK WET PELLETING PROCESS AND APPARATUS
Filed March 20, 1957
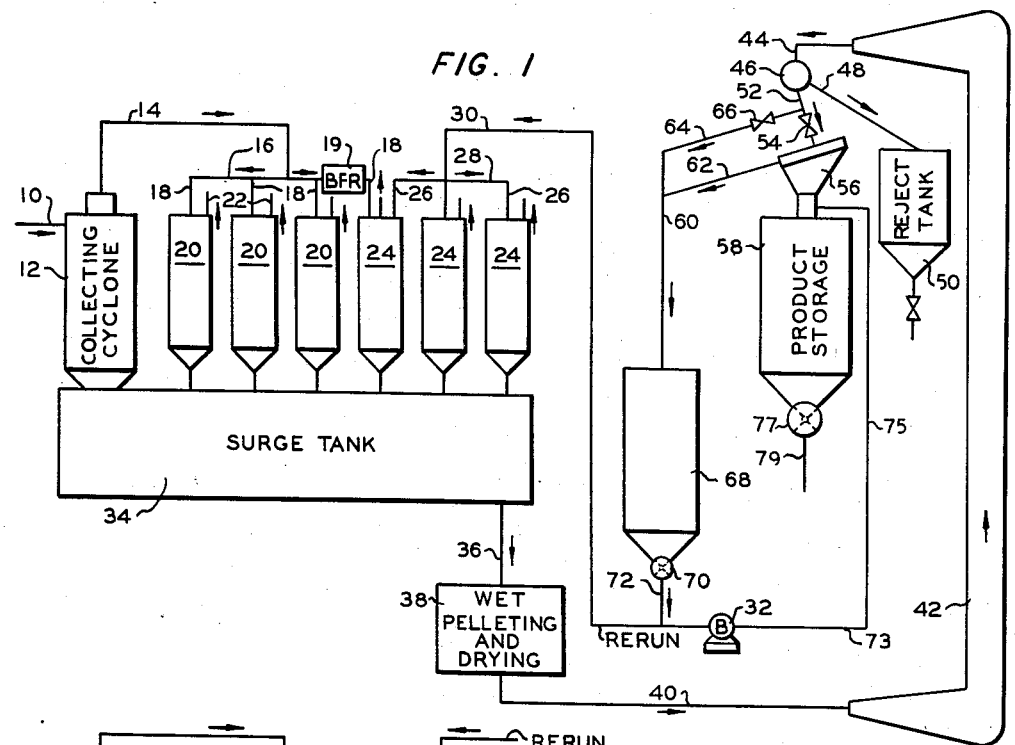
INVENTOR.
W. R. KING
BY Hudson & Young
ATTORNEYS

United States Patent Office 2,949,349
Patented Aug. 16, 1960

2,949,349

CARBON BLACK WET PELLETING PROCESS AND APPARATUS

William R. King, Bartlesville, Okla., assignor to Phillips Petroleum Company, a corporation of Delaware Filed Mar. 20, 1957, Ser. No. 647,408

15 Claims. (Cl. 23—314)

This invention relates to a process and apparatus for pelleting carbon black.

It is conventional to pellet various types of carbon blacks in order to facilitate handling without excessive loss of the black to the atmosphere and to reduce the bulk of the black. One pelleting method comprises tumbling the loose flocculent black in a horizontally elongated cylindrical mill by rotation of the mill so that the black emerges from the delivery end of the mill in the form of small pellets. In another type of process, the black is fed to a pug mill and there admixed with water so that the agitation of the black provided by the mill forms the black into pellets. Usually several of these mills are connected in series so that the carbon black is converted into small pellets by the time it passes thru the several mills and emerges from the last mill of the series. The pellets are then fed to a dryer which removes the water and leaves the carbon black in the form of small dry pellets with a minor amount of carbon black dust in the pellet stream.

One of the problems connected with the wet pelleting of carbon black is the difficulty in co-ordinating the flow rate of water and loose black to the pellet mill so as to maintain a substantially uniform water content in the pellets egressing from the mill. The difficulty lies in the great bulk or low density of the flocculent carbon black and the tendency of the black to cake onto the mechanical feeding devices, such as screw feeders and similar type conveyors used to feed flocculent black into the feed end of the pellet mill. In wet pelleting it is essential to maintain the water content of the black within a relatively narrow range of about 48 to 54 percent by weight depending upon the characteristics of the carbon black being pelleted. If the proportion of water in the black is too low, pelleting does not take place readily in the time and space provided in the mill; and with too great a concentration of water the mixture of black and water forms a carbon black mud which does not pellet.

Another problem involved in the pelleting of carbon black lies in the prevention of plugging of the bag filters utilized in separating carbon black from the gaseous effluent stream from the carbon black furnaces and particularly downstream of a cyclone separator which removes the major portion of the carbon black. It is essential from an economic point of view to recover fines and oversize pellets and aggregates from the product stream of the pelleting process and pass the recovered black in the rerun line to the bag filters. It is also necessary to rerun off-specification pellets. Frequently the rerun carbon black is of such character as to cause plugging of the bag filters thereby requiring shutting down of the furnaces and collecting system.

I have devised a wet pelleting process and apparatus which maintains a substantially uniform content of water in the carbon black in a wet pelleting mill and which avoids the shutdown of the carbon black furnaces due to plugging of the bag filter.

Accordingly, it is an object of the invention to provide an improved apparatus and process for pelleting carbon black. Another object is to provide a novel method and apparatus for maintaining a constant weight concentration of water in the effluent pellets from a wet pelleting process. A further object is to provide a novel arrangement of a carbon black collecting system and an improved method of collecting carbon black from a series of carbon black furnaces and from the rerun carbon black line which avoids plugging of the main filters even though the rerun black is filter-plugging in character. Other objects of the invention will become apparent from a consideration of the accompanying disclosure.

One embodiment of the invention comprises means for controlling the rate of feed of dry flocculent carbon black to a wet pelleting mill so as to maintain a constant weight concentration of water in the effluent pellets. The dry carbon black is fed to the inlet end of the wet pelleting mill by means of a motor operated conveyor, such as a screw conveyor, and water is fed to the pelleting mill at a constant rate. The effluent pellets are passed in a continuous stream onto a weigh belt or weighing conveyor which automatically weighs the pellets passing over the belt at any given period and emits a pneumatic signal proportional to the weight of pellets on the belt. This automatic signal is transmitted to a speed controller or changer on a motor driving the feed conveyor to the pellet mill. This arrangement of apparatus effects the production of an effluent pellet stream of substantially constant water concentration and, in effect, feeds into the mill the required amount of dry black for the amount of water continually being introduced to the mill. The stream of wet pellets is then densified in one or more densifiers and the densified pellets are passed thru a suitable dryer where the moisture content is reduced to a desirable range, usually below 1% by weight.

Another embodiment of the invention lies in the black collecting system and the process of collecting the black downstream of the carbon black furnaces. Most of the black is recovered from the gaseous effluent line downstream of the furnaces by means of a cyclone separator which delivers the black to a surge tank. The effluent gas from the cyclone is passed thru a series of bag filters connected in parallel which deliver the recovered black to the surge tank and vent the clean gas. Another series of bag filters is utilized in recovering rerun black which includes off specification black as well as fines and oversized pellets and aggregates recovered from the effluent stream from the dryer. When two streams of gas are to be filtered and the filtered solids combined, it is necessary that each stream be filtered in separate compartments if there is danger of the solids in one stream plugging the filter elements. If more than one compartment is required for each stream, the compartments are usually not used at full capacity. If the two gas streams each require the full capacity of one or more filter compartments and a fraction of another compartment, it is economical if one compartment is used to filter that gas from each stream which would be filtered in a compartment at less than capacity. By the practice of this invention that gas from each stream which would be filtered in separate compartments at less than capacity, is filtered in one compartment. Hence, one bag filter is common to both series of filters and in order to prevent plugging of other filters in the first series of filters receiving the off gas from the cyclone, a back flow regulator is placed in the inlet line to the common filter from the off gas line. In this manner, when the filter in the second series being used in recovering black from the rerun stream becomes plugged due to the character of the rerun black, necessitating the shutting down of the second series of filters, the first series of filters can be kept in operation so as not to require shutting down of the plant.

A more complete understanding of the invention may be obtained by reference to the accompanying schematic drawing of which Figure I shows a flow control device and arrangement of apparatus in accordance with one embodiment of the invention and Figure II is a similar view showing a specific arrangement of the control means for maintaining constant water concentration in the pellet mill and effluent stream therefrom.

Referring to Figure I, an effluent line 10 from a series of carbon black furnaces (not shown) leads into a cyclone separator or collector 12. An effluent off gas line 14 connects with a header or manifold 16 which in turn connects with individual inlet lines 18 leading to a first series of bag filters 20. Each of bag filters 20 is provided with a vent line 22. Filters in a second series of filters 24, including the last filter 20 of the first series, are connected to inlet lines 26 which connect with header or manifold 28. Rerun line 30 connects with header 28 and is provided with a blower 32.

A surge tank 34 receives recovered black from cyclone 12 and both series of filters 20 and 24. An outlet line 36 from surge tank 34 passes loose black to a wet pelleting and drying system 38 which is shown in more detail in Figure 2. An effluent pellet line 40 from the pelleting and drying system connects with an elevator 42 which delivers the effluent pellet stream from the dryer to line 44 for introduction to magnetic drum 46, a conventional magnetic device for removing iron and steel particles such as nuts, bolts, screws, and iron particles introduced to the carbon black pellet stream from conveyors and other equipment in the system. Line 48 passes rejected metal from device 46 to a reject tank 50 for suitable disposal. The effluent pellets from device 46 are usually passed thru line 52 containing valve 54 to a screening device 56 which passes the product size pellets to storage vessel 58 and oversized material to line 60 via line 62. Line 64 containing valve 66 connects with line 52 and with line 60 for passage of any portion of the pellet stream in line 52 directly to line 60 for rerun by operating valves 54 and 66 when product pellets in line 52 are off specification or for any other reason. Line 60 leads into a storage vessel 68 which is provided with a hopper and feeder 70 for delivery of rerun material via line 72 to line 30.

In Figure II the same carbon black collection system is shown as that in Figure I and corresponding elements of the system are correspondingly numbered. A screw conveyor 80 collects black from the bottom of surge tank 34 and delivers the same thru conduit 36 to pellet mill 82. Pellet mill 82 is a conventional pug mill provided with an axial shaft 84 and radial rods 86 of varying length on the shaft. These rods rotating on shaft 84 effect nodulizing or pelleting of the black when admixed with the proper amount of water. Shaft 84 is driven by electric motor 88 and shaft 90 on screw conveyor 80 is driven by motor 92. A water line 83 is provided with a flow control valve 85 and rate of flow meter 87. A weigh belt conveyor 94 is positioned so as to receive effluent pellets from mill 82 and pass the same to a first densifier 96. The weigh belt includes means for sending out a pneumatic signal proportional to the weight on the belt at any given time. This signal is transferred to pneumatic control element 95 which is in control of motor speed changer or controller 93 on the motor 92 on conveyor 80. The effluent pellets from densifier 96 pass to densifier 98 and then to densifier 100 from which densifier pellets are passed via conduit or conveyor 102 to dryer 104. Line 106 connects with a hot gas source (not shown) and with dryer 104. Effluent gas leaves the dryer thru line 108 and any portion of the same may be recycled to the hot gas source. Dry pellets are recovered thru effluent line 40. Densifiers 96, 98, and 100 are conventional pug mills which effect the desired densification of the pellets.

In operation in accordance with the invention utilizing the arrangement of apparatus shown in the drawing, quenched carbon black effluent from a series of furnaces is passed thru line 10 into cyclone 12 in which most of the carbon black is recovered and delivered to surge tank 34. The offgas from the cyclone passes thru bag filters 20 in parallel and the recovered carbon black is also delivered to surge tank 34. Dry flocculent carbon black is passed from surge tank 34 by means of conveyor 80 driven by motor 92 to pellet mill or pug mill 82 via conduit 36. Water is delivered to the mill 82 at a constant rate under the control of valve 85 and rate of flow meter 87. The rate of water flow is set for a desired feed rate of carbon black to the mill within the capacity of screw conveyor 80 and mill 82. The effluent pellet stream from mill 82 passes over weigh belt 94 which includes a pneumatic device adapted to send out a pneumatic signal proportional to the weight on the weigh belt which is transferred to pneumatic control 95 which communicates with pneumatic speed changer or controller 93 and varies the speed of motor 92 so as to deliver carbon black at the proper rate for the rate of water passing thru line 83 to provide satisfactory pelleting and a constant weight of water in the effluent pellets passing over belt 94.

The pellets leaving belt 94 are densified in densifiers 96, 98, and 100 and are then passed to dryer 104 where they are reduced in moisture content to below 1% by weight. The dry pellet stream is passed thru line 40 to elevator 42 from which it passes thru magnetic drum 46 and thence to storage 58 and/or to rerun via line 60, storage vessel 68 and rerun line 30. Blower 32 suspends the carbon black pellets and fines in a suitable gas such as air and passes the suspension to the second bag filter system including filters 24 for recovery of carbon black from the suspension. In order to prevent back flow of carbon suspension from the common filter in the two series of filters back-flow regulator 19 is positioned in the inlet line 18 leading to the common filter. When the rerun carbon black is plugging in nature, plugging of the first three filters 20 in the first series is avoided and filters 24 can be cleaned by temporarily shutting down rerun blower 32.

This invention is especially adapted to a plant where carbon black is produced from a series of reactors and the carbon black is wet pelleted. The fines from screened wet pelleted and dried carbon black are carried in a gaseous rerun stream and passed into a first group of filter compartments. When off-specification carbon black, such as that containing too much moisture or that which is off-specification for some other reason, is produced, this carbon black is added to the rerun fines stream and passed back into the second group of filter compartments. This recycle black may at times plug the bag filters and require shutdowns for cleaning out the bag filter compartments. For this reason, it is undesirable to combine the two streams of carbon black-containing gas and pass the combined streams into all compartments of the bag filter. If the compartments used for filtering the rerun back become plugged, the rerun black can accumulate and be filtered at a later time. However, if the effluent from the reactors cannot be filtered as produced, it is necessary to shut the reactors down and lose production.

To illustrate operation in accordance with the invention, carbon black in suspension in a gaseous stream carrying carbon black at the rate of 2,000 pounds per hour in 3,000 pounds of gas at a temperature 250° F. and a pressure of 14 inches of water are passed thru line 10 into the collection system. The rate of flow of carbon black in line 14 is about 400 pounds per hour and the gas in this line amounts to 3,000 pounds per hour at 245° F. and at about 11 inches of water pressure. The feed rate in line 36 feeding the wet pellet mill is maintained constant in the range of 2,000 to 3,000 pounds per hour by passing water through line 83 at a constant rate calculated to incorporate 51 percent water and 49 percent carbon black in the effluent stream passing from the mill across weigh belt 94. The ratio of water to carbon black is determined by varying the amount of carbon black until the pelleting operation is satisfactory to one skilled in the art of carbon black pelleting upon examination of the effluent pellets. When the pellets are found to be optimum in appearance and quality the same are analyzed for water content and the water carbon black ratio is set on instruments 95 and 93 so that the apparatus automatically incorporates substantially 51 percent water in the effluent pellets.

Effluent pellet stream from weigh belt 94 passes thru densifiers 96, 98, and 100 in succession and the densified pellets are passed thru dryer 104 which is a jacketed kiln thru which hot combustion gas is passed, both thru the jacket and directly thru the interior of the kiln so as to carry off evaporated moisture from the inside of the kiln. The pellets in the effluent pellet stream in line 40 have a density of about 23 pounds per cubic foot and a moisture content below 1%. (Gas entering kiln is at about 700° F. from burning of 4½ cubic feet of natural gas per pound of dry pellets recovered from the dryer.)

About 1975 pounds of pellets per hour pass into hopper 56 and about 15 pounds of oversized pellets and aggregates of carbon black pass thru line 60 to the rerun system. Fines are picked up from an elutriator (not shown) in the line between hopper 56 and storage vessel 58. Fines are also recovered from the product pellet stream by elutriation when loading freight cars and during bag loading from line 79 by operation of header valve 77 by elutriation means not shown. The recovered fines are introduced to line 73 and are passed in entrained gas by blower 32 to rerun line 30. The amount of carbon black in line 30 varies from about 30 to 2,000 pounds per hour depending upon whether or not pellets are unsatisfactory or off specification and are being routed to the rerun line via line 60.

While the invention has been described in connection with present preferred embodiments thereof, it is to be understood that this description is illustrative only and is not intended to limit the invention.

I claim:

1. A process for pelleting carbon black comprising continuously passing dry flocculent carbon black into a wet pelleting mill maintained under agitating conditions; feeding water at a constant rate to said mill and mixing same with said black to form pellets therein; continuously passing all of the effluent stream of wet pellets from said mill over a weighing device to ascertain the weight rate of producing wet pellets; and, as said weight rate varies from a predetermined value, directly varying the rate of feeding said black to said mill in response to said weight rate so as to maintain said weight rate substantially constant.

2. The process of claim 1 wherein the pellets are passed from the weighing device thru at least one densifying zone wherein the density of the pellets is increased by compaction.

3. The process of claim 2 including the step of drying the compacted and densified pellets.

4. The process of claim 1 including the steps of densifying the pellets after weighing same; drying the densified pellets; recovering fines from the effluent pellets from the densifying step; and recycling said fines to the pelleting step.

5. The process of claim 1 wherein the flowrate of water is in the range of 48–54 weight percent of the weight rate of pellet flow.

6. A process for producing carbon black in pelleted form comprising passing an effluent gaseous suspension of carbon black from at least one carbon black furnace thru a gas-solids separation zone so as to remove the major portion of the carbon black; passing the effluent gas from said separation zone thru a first plurality of bag filters in parallel to remove the major portion of the residual carbon black; passing recovered carbon black to a wet pelleting mill and wet pelleting same therein; drying the effluent pellets; separating oversize pellets and fines from said effluent pellets; suspending said fines and oversize pellets in a gaseous stream as rerun carbon black; passing said stream thru a second plurality of bag filters in parallel, including one filter in said first plurality; preventing backflow from the common filter to other filters in the first plurality; and passing the recovered rerun carbon black to said pelleting mill as a portion of the feed thereto.

7. The process of claim 6 including the steps of passing a stream of water to said pelleting mill at a uniform rate; passing the effluent wet pellets over a weigh belt to determine the weight-rate of pellet flow; and regulating the flow of loose black to said mill so as to maintain said weight-rate of pellet flow substantially constant.

8. The process of claim 7 wherein the flow rate of water is in the range of 40 to 55 weight percent of the weight-rate of pellet flow.

9. Apparatus for producing wet carbon black pellets at a substantially constant rate comprising in combination, a pellet mill having an inlet line for carbon black and an effluent line for pellets; a water line leading into said mill having a flow control valve therein; a carbon black feeder in said inlet line; a motor arranged to drive said feeder; weighing means in said effluent line sensitive to the weight rate of pellets passing therethru which emits a signal of an intensity proportional to said weight rate; speed control means on said motor; control means directly responsive to said signal in direct control of said speed control means, adapted to maintain said weight rate substantially constant.

10. Apparatus for producing wet carbon black pellets at a substantially constant rate comprising in combination, a pellet mill having an inlet line for carbon black and an effluent line for pellets; a water line leading into said mill having a flow control valve therein; a carbon black feeder in said inlet line; a motor arranged to drive said feeder; a weigh belt conveyor in said effluent line which weighs the pellets passing over same and emits a pneumatic signal of an intensity proportional to the weight rate of producing said pellets; a pneumatic control directly sensitive to said signal; and a speed changer on said motor directly responsive to said pneumatic control which changes the speed of said motor directly as said signal changes to maintain said weight rate substantially constant.

11. Apparatus comprising in combination a collecting system for carbon black in a line carrying the effluent gaseous stream from a series of carbon black furnaces including a cyclone separator and a series of bag filters downstream of said separator connected in parallel in the effluent gas line from said separator; a second series of bag filters one of which is common to both series, said second series being connected in parallel in a later described rerun line; a back flow regulator in the inlet line to said common filter from said separator; a surge tank for collecting carbon black from said cyclone and filters; a pellet mill connected with said surge tank by a conveyor; a valved water line leading into said mill; pellet drying means downstream of said mill; an effluent pellet line from said drying means; means for separating and recovering fines and oversize pellets from the pellet stream in said effluent pellet line; a rerun line connected with last said means and with said second series of filters; and blower means for maintaining a solids entraining gas stream in said line flowing to said filters.

12. The apparatus of claim 11 including at least one pellet densifier intermediate said mill and said pellet drying means.

13. In a process for pelleting flocculent carbon black with water comprising continuously passing a regulated stream of water and a regulated stream of said black into a pelleting mill; mixing said black and water in said mill to form pellets thereof as the mixture passes thru said mill; and recovering the resulting wet pellets in a continuous effluent stream from said mill, wherein it is difficult to accurately control the rate of feed of said black to said mill, the improvement comprising maintaining the rate of flow of water constant; continuously weighing said effluent stream of wet pellets to determine the weight rate of producing same; and directly varying the feed rate of said black in response to said weight rate so as to maintain the weight rate of producing wet pellets substantially constant.

14. The apparatus of claim 9 wherein said feeder comprises a screw conveyor.

15. A process for pelleting flocculent carbon black with water comprising continuously feeding a stream of said black into a wet pelleting zone by means of a mechanical feeder; continuously passing a separate stream of water into said zone in suitable proportion to said black to form wet pellets; mixing and agitating the water and black in said zone so as to form a continuous effluent stream of wet pellets; continuously passing all of said effluent stream thru a weighing zone to determine the weight rate of producing wet pellets; and maintaining the proportions of water and black suitable for good pelleting by feeding a constant stream of water and regulating the rate of feeding said black by varying the rate of said mechanical feeder in response to said weight rate so as to maintain said weight rate of producing wet pellets substantially constant.

References Cited in the file of this patent

UNITED STATES PATENTS

| Re. 21,379 | Glaxner | Mar. 5, 1940 |
| 2,288,087 | Hanson et al. | June 30, 1942 |
| 2,457,962 | Whaley | Jan. 4, 1949 |
| 2,778,715 | Austin | Jan. 22, 1957 |
| 2,800,399 | King | July 23, 1957 |
| 2,843,874 | Wood | July 22, 1958 |